United States Patent [19]

Bryan

[11] 4,435,905

[45] Mar. 13, 1984

[54] TELESCOPING MAGNETIC BALL BAR TEST GAGE

[75] Inventor: James B. Bryan, Pleasanton, Calif.

[73] Assignee: The United States of America as represented by The United States Department of Energy, Washington, D.C.

[21] Appl. No.: 358,084

[22] Filed: Mar. 15, 1982

[51] Int. Cl.$^3$ .............................................. G01B 7/31
[52] U.S. Cl. ............................. 33/181 R; 33/180 R; 33/DIG. 1
[58] Field of Search ................. 33/143 L, 158, 147 K, 33/161, 180 R, 181 R, 182, 184.5, 147 D, 185 R, 174 L, DIG. 1

[56] References Cited

U.S. PATENT DOCUMENTS

| | | | |
|---|---|---|---|
| 2,943,394 | 7/1960 | Schabot | 33/147 K |
| 3,187,439 | 6/1965 | Lerch | 33/181 R |
| 3,646,686 | 3/1972 | Kreiskorte | 33/182 |
| 3,718,019 | 2/1973 | Box | 33/182 |
| 3,723,928 | 3/1973 | Blakey et al. | 33/DIG. 1 |
| 3,937,271 | 2/1976 | Akiba et al. | 33/182 |
| 4,115,925 | 9/1978 | Malak | 33/181 R |

OTHER PUBLICATIONS

Hallett et al., "Technology for Industrial Manufacturing," 1972, pp. 73 to 76 and pp. 409–411.
"Notes on Applied Science No. 15, Application of Spring Strips to Instrument Design", National Physical Lab (England).
"Handbook of Industrial Metrology," American Society of Tool and Manufacturing Engineers, pp. 234–236.
"American National Standard Measurement of Out-of-Roundness, ANSI B89.3.1–1972", The American Society of Mechanical Engineers.

*Primary Examiner*—Willis Little
*Attorney, Agent, or Firm*—Gary C. Roth; L. E. Carnahan; Michael F. Esposito

[57] ABSTRACT

A telescoping magnetic ball bar test gage for determining the accuracy of machine tools, including robots, and those measuring machines having non-disengageable servo drives which cannot be clutched out. Two gage balls (10, 12) are held and separated from one another by a telescoping fixture which allows them relative radial motional freedom but not relative lateral motional freedom. The telescoping fixture comprises a parallel reed flexure unit (14) and a rigid member (16, 18, 20, 22, 24). One gage ball (10) is secured by a magnetic socket knuckle assembly (34) which fixes its center with respect to the machine being tested. The other gage ball (12) is secured by another magnetic socket knuckle assembly (38) which is engaged or held by the machine in such manner that the center of that ball (12) is directed to execute a prescribed trajectory, all points of which are equidistant from the center of the fixed gage ball (10). As the moving ball (12) executes its trajectory, changes in the radial distance between the centers of the two balls (10, 12) caused by inaccuracies in the machine are determined or measured by a linear variable differential transformer (LVDT) assembly (50, 52, 54, 56, 58, 60) actuated by the parallel reed flexure unit (14). Measurements can be quickly and easily taken for multiple trajectories about several different fixed ball (10) locations, thereby determining the accuracy of the machine.

10 Claims, 3 Drawing Figures

TELESCOPING MAGNETIC BALL BAR TEST GAGE

The U.S. Government has rights in this invention pursuant to Contract No. W-7405-ENG-48 between the U.S. Department of Energy (DOE) and the University of California for the performance of research and development work at the Lawrence Livermore National Laboratory (LLNL).

BACKGROUND OF THE INVENTION

The invention described herein relates generally to apparatus and method for determining the accuracy of machines having servo drives, and more particularly to apparatus and method for determining the accuracy of machine tools, including robots, and those measuring machines having non-disengagable servo drives which cannot be clutched out.

Many measuring machines and robots, and all machine tools have non-disengagable servo drives which cannot be clutched out. Many of these machines, which include lathes and milling machines, are numerically controlled and may be programmed to direct their active element to execute predetermined spatial trajectories. These machines must be tested to very precisely determine the accuracy to which those trajectories can be maintained. There are known methods of doing this. Unfortunately these methods require both elaborate apparatus and a great deal of time. One such method involves what are known as 'parametric' tests which can require as much as two weeks to perform. These tests involve equipment such as straight edges, squares, laser interferometers, and gage blocks. Individual measurements are made of those parameters which determine the volumetric accuracy of the machine being tested. These parameters include, among others, straightness and squareness of travel, accuracy of angular motion, and accuracy of linear displacement.

Another method, involving what are known as two and three dimensional ballplates, requires very heavy and costly to construct apparatus which must first be calibrated as a primary standard. This initial calibration process requires a great deal of time and the apparatus can easily be rendered out of tolerance by any improper handling. The apparatus includes large table-top-like platforms into which are bored several holes. Vertical rods of equal or different lengths, each tipped with a spherical ball-like member, are secured in the holes. The relative positions of the centers of the elevated balls are measured with a high precision measuring machine. The evaluation is performed by seeing how accurately the machine being tested can determine these known positions. This method suffers the disadvantage of providing relatively few test positions at only a small number of vertical heights.

Measuring machines not having a servo drive or having a disengagable servo drive which can be clutched out, often termed frictionless coordinate measuring machines, have been tested with what are known as ball bar standards. These standards comprise rigid bars tipped on both ends with spherical ball-like members. This test involves the determination by the machine being evaluated of the center-to-center distance of the ball bar balls. This technique serves primarily as a means of verifying volumetric accuracy, and is not a diagnostic tool in the sense of the more conventional techniques which can also assess straightness and orthogonality.

A relatively new technique for the testing and evaluation of frictionless coordinate measuring machines involves the use of a rigid ball bar standard, substantially as described in the preceding paragraph, each ball of which is held within a magnetic socket knuckle assembly. One knuckle assembly is attached to the measuring machine while the other is free to move about on the spherical surface determined by ball bar length. The machine is evaluated by having it determine, for various orientations, the center-to-center spacing of the ball bar standard balls. This technique is not applicable to machine tools or measuring machines having non-disengagable servo drives which cannot be clutched out.

Thus, at the present time, a major problem facing the machine tool, robot, and measuring machine industries is the inability to quickly, easily and economically determine the accuracy of machine tools, robots, and those measuring machines having non-disengagable servo drives which cannot be clutched out.

SUMMARY OF THE INVENTION

It is therefore an object of the invention to provide a test gage for quickly, easily and economically determining the accuracy of machines having servo drives.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particulary pointed out in the appended claims.

To achieve the foregoing and other objects and in accordance with the purpose of the present invention, as embodied and broadly described herein, the test gage of this invention comprises two gage balls held and separated from one another by a telescoping fixture which allows the balls relative radial motional freedom but not relative lateral motional freedom. One of the gage balls is secured by a first securing means which maintains the center of the ball at a fixed location with respect to the machine being tested. The other gage ball is secured by a second securing means which is engaged or held by the machine in such manner that the center of that ball is directed by the machine to execute a prescribed trajectory, all points of which are equidistant from the center of the fixed gage ball. The trajectory may be circular. As the moving ball executes its trajectory, changes in the radial distance between the centers of the two balls are determined or measured. These changes are caused by inaccuracies in the machine, since in the ideal situation the radial distance would not change. A complete determination of the accuracy of the machine requires a multiplicity of measurements taken for a multiple of trajectories about several fixed ball locations. These measurements can be made very easily with this rugged and relatively simple to construct test gage.

Preferably the telescoping fixture holding and separating the two gage balls comprises a rigid member and a parallel reed flexure unit.

Preferably the two holding means comprise two magnetic socket knuckle assemblies which hold the gage balls magnetically while allowing them to rotate about fixed centers.

It is also preferred that the changes in radial distance between the centers of the two gage balls be determined or measured by a linear variable differential transformer (LVDT) assembly actuated by the parallel reed flexure unit.

The benefits and advantages of the present invention, as embodied and broadly described herein, include, inter alia, the provision of a test gage of economical construction which can quickly and easily determine the accuracy of machines having servo drives.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
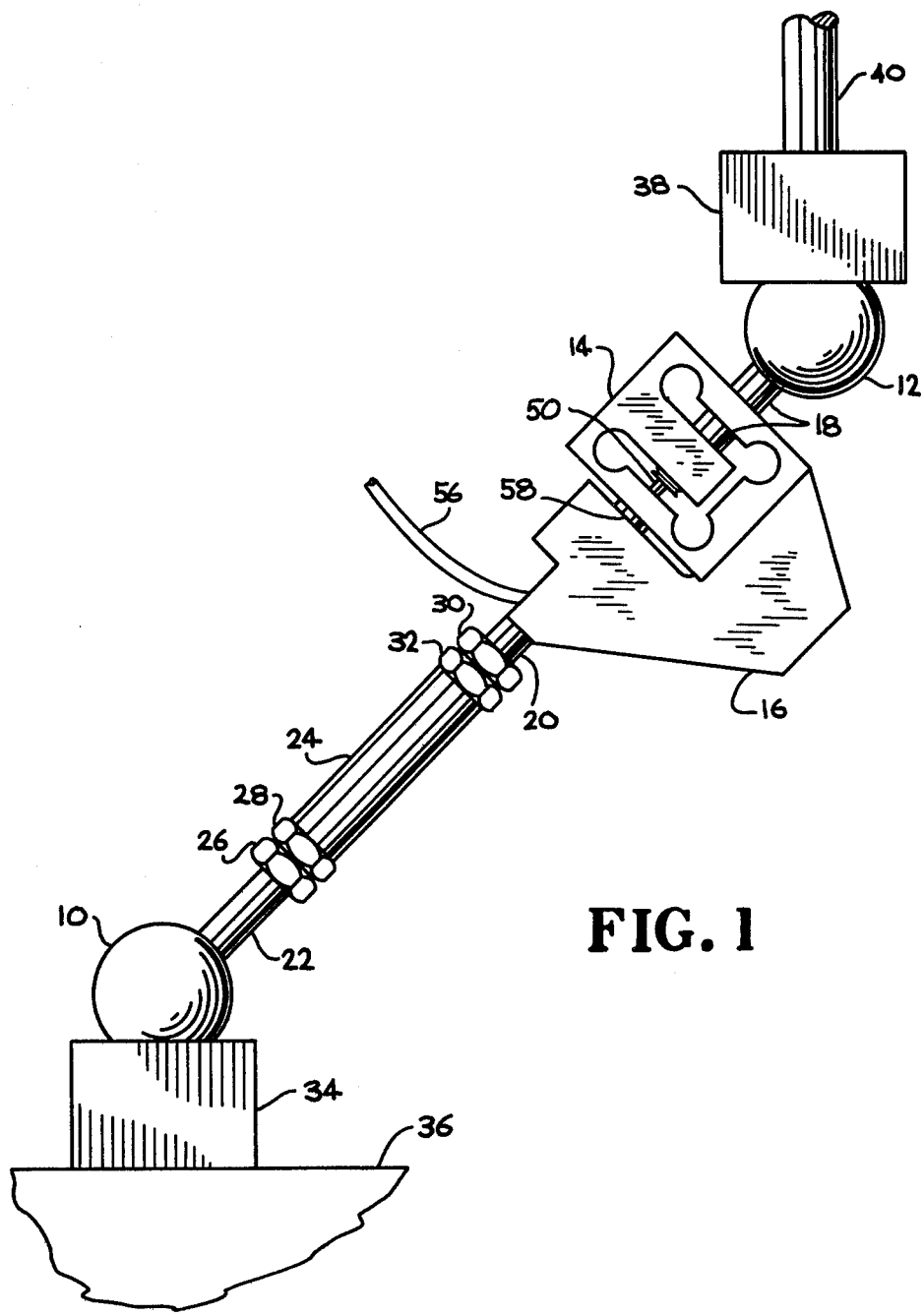
FIG. 1 is a side view of a test gage made in accordance with the invention.

Reference will now be made in detail to the present preferred embodiment of the invention, an example of which is illustrated in the accompanying drawings. Reference is first made to FIG. 1 which shows a test gage made in accordance with the invention. A first gage ball 10 and a second gage ball 12 are shown. Gage ball 10 is positioned at a fixed location with respect to a stationary surface, such as the worktable, of the machine being tested. Gage ball 12 is positioned at a fixed location with respect to the active element of the machine being tested. Preferably gage balls 10 and 12 are chrome steel balls 1.000 inch in diameter having 5 microinch sphericity. Gage balls of this kind are manufactured by "MICRO SURFACE ENGINEERING" of Los Angeles, Calif., "THE HOOVER COMPANY" of Erwin, Tenn., and "INDUSTRIAL TECTONICS" of Ann Arbor, Mich.

Means are provided for maintaining gage balls 10 and 12 in a relationship allowing relative radial motional freedom while not allowing relative lateral motional freedom. Preferably such telescoping means include parallel reed flexure unit 14 and a rigid member comprising housing 16, rods 18, 20 and 22, and extension rod 24. Extension rod 24 is attached to rod 22 by means of screw couplers 26 and 28, and to rod 20 by means of screw couplers 30 and 32. Extension rods of various lengths may be used to make relatively large changes in the center-to-center spacing of gage balls 10 and 12.

Means are provided for measuring or determining very small changes in the radial distance between the centers of gage balls 10 and 12. Preferably such means include a linear variable differential transformer (LVDT) assembly actuated by parallel reed flexure unit 14. LVDT cable 56, LVDT core rod 50, and LVDT case 58, may each be partially observed on FIG. 1.

The relatively massive parallel reed flexure unit 14 and housing 16 should be positioned, within the assembly holding gage balls 10 and 12, as near as conveniently possible to either one or the other of the balls. This serves to reduce bending movement in the assembly and thereby to improve the accuracy of the test gage.

First gage ball 10 is secured by first magnetic socket knuckle assembly 34, which is positioned at a fixed location with respect to a stationary surface, 36, of the machine being tested. In many situations surface 36 represents the worktable of the machine being tested. Second gage ball 12 is secured by second magnetic socket knuckle assembly 38. The machine whose accuracy is being tested holds or engages magnetic socket knuckle assembly 38, by means schematically represented by rod 40, and directs the center of second gage ball 12 to execute a prescribed trajectory having all points equidistant from the center of first gage ball 10. Preferably, and in the usual case, the prescribed trajectory will be circular. Rod 40 may be thought of as the active element of the machine being tested. Magnetic socket knuckle assembly 38 may be attached to rod 40 by any appropriate means.

Figure 2:
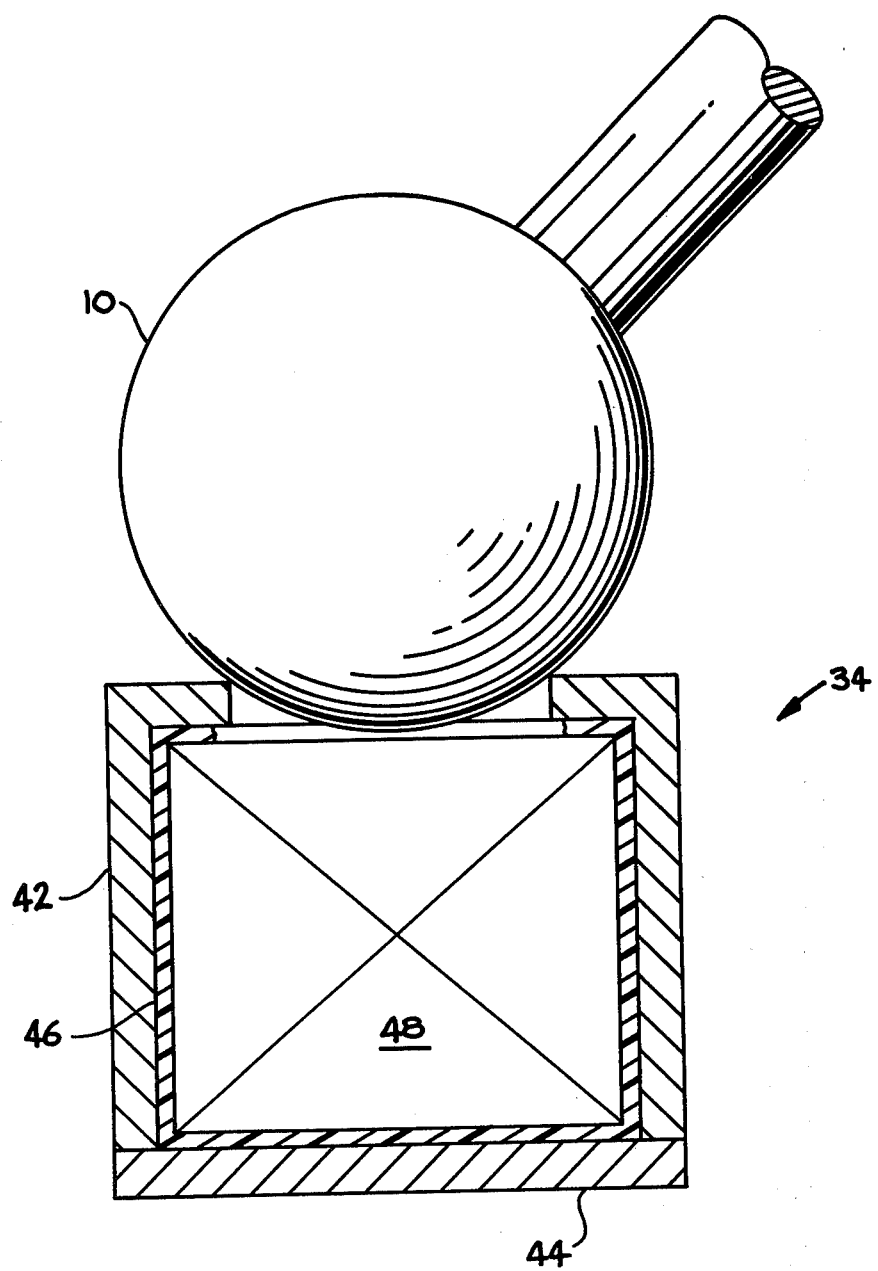
FIG. 2 is a cross sectional side view of the first magnetic socket knuckle assembly of the test gage of FIG. 1.

Reference is now made to FIG. 2 which is a cross sectional side view of first magnetic socket knuckle assembly 34. Second magnetic socket knuckle assembly 38 is substantially similar. Assembly 34, which holds gage ball 10 magnetically so that it is allowed to rotate about its fixed center, comprises steel magnet jacket body 42, steel magnet jacket base 44, plastic steel liner 46, and magnet 48. Plastic steel of the kind used in liner 46 is manufactured by the "DEVCON COMPANY" of Danvers, Mass. Plastic steel is preferred because of its ability to conduct magnetic flux and thereby to insure that gage ball 10 will be securely held. Magnets such as magnet 48 are manufactured by "DOWLING, MINOR MAGNETICS CORPORATION" of Novato, Calif. Gage ball 10 is positioned upon an opening in steel magnet jacket body 42. The opening is basically a circular aperture. Preferably, the circular aperture may be relieved to allow trihedral contact support of gage ball 10. Trihedral contact support prevents rocking and promotes the secure positioning of gage ball 10 within magnetic socket knuckle assembly 34.

Figure 3:
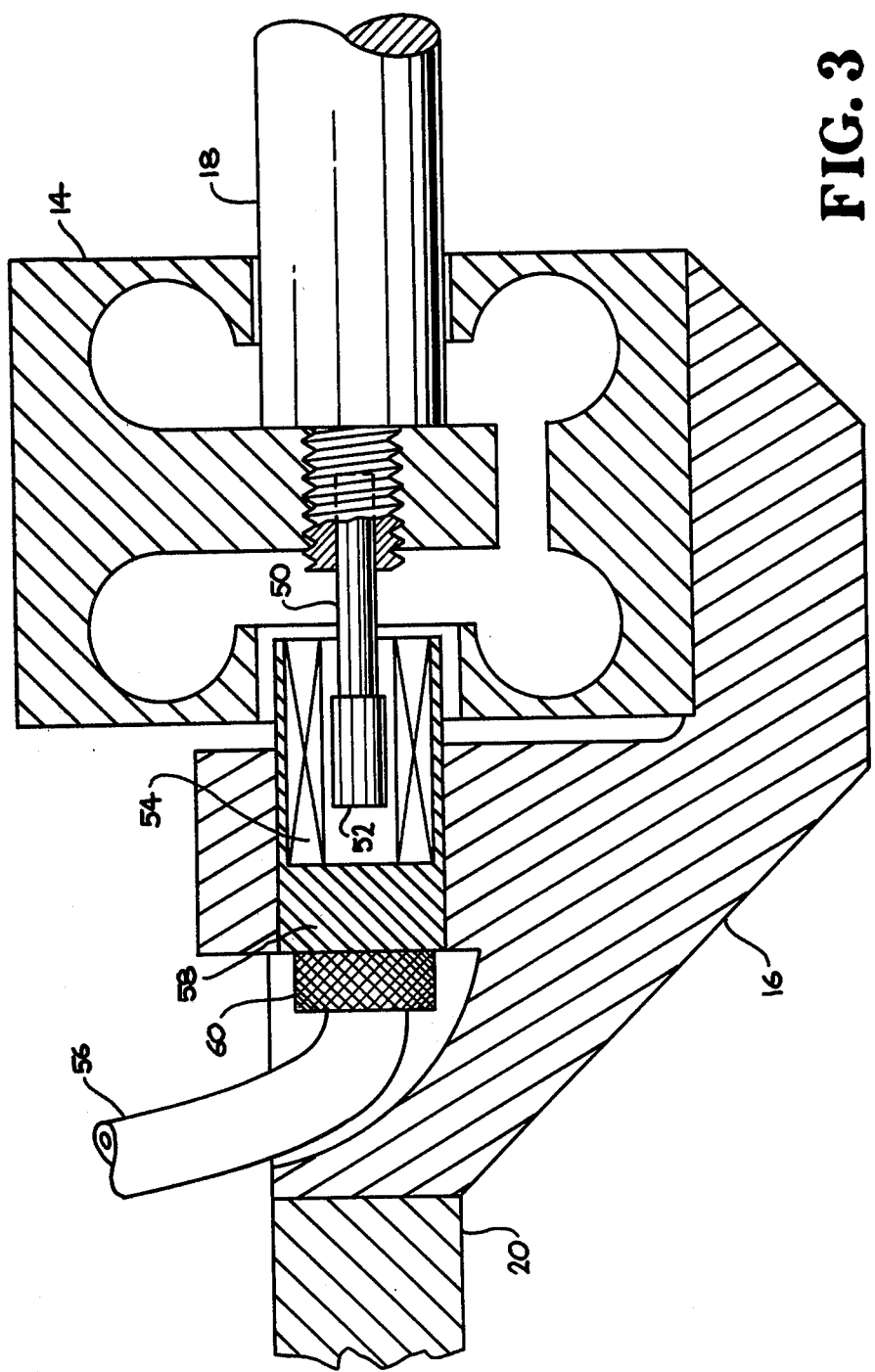
FIG. 3 is a cross sectional side view of the portion of the telescoping fixture of the test gage of FIG. 1 comprising in part a parallel reed flexure unit, a housing, and a linear variable differential transformer (LVDT).

Reference is now made to FIG. 3 which is a cross sectional side view of parallel reed flexure unit 14, housing 16, the LVDT assembly, and parts of rods 18 and 20. Parallel reed flexure unit 14 is a very well known device which allows radial motional freedom but not lateral motional freedom. The mechanical theory related to parallel reed flexure units is discussed in "Notes on Applied Science No. 15, Application of Spring Strips to Instrument Design", National Physical Laboratory (England), Her Majesty's Stationery Office, London (1956). As the center-to-center spacing of gage balls 10 and 12 changes, rod 18 moves in or out with respect to parallel reed flexure unit 14. As this happens, LVDT core rod 50 and LVDT core 52 are similarly moved. In particular, the positioning of LVDT core 52 is changed within LVDT pick up coil 54. An electrical signal proportional to this positional change is produced by the LVDT and transmitted to an external amplifier and recorder, which is not shown, via LVDT cable 56. LVDT cable 56 is attached to LVDT case 58, within which is positioned LVDT pick up coil 54, by means of LVDT cable plug 60. LVDTs of the kind herein described are very well known and are manufactured by "BENDIX CORPORATION" of Dayton, Oh. The general theory of the LVDT is treated in "Handbook of Industrial Metrology", American Society of Tool and Manufacturing Engineers, Prentice-Hall, Inc. (1967), pages 234 to 236. It is preferred that the mechanical travel of parallel reed flexure unit 14 be limited to about ±0.06 inch, and that the LVDT be adjusted to give a full range of output signals as LVDT core 52 executes a ±0.004 inch excursion within LVDT pick up coil 54. Actual machine tool discrepancies should be within this range. However, longer ranges may be appropriate for robots.

While in principle any trajectory existing on the surface of sphere may be prescribed, in normal usage the test gage of the invention functions by yielding a measurement of the changes occurring in the center-to-center spacing between gage balls 10 and 12 as gage ball 12 is caused to execute a full 360 degree prescribed circular trajectory. In the ideal situation, with a perfect machine, the center-to-center spacing would not change. The complete testing of machine accuracy requires a multiplicity of measurements taken for a multiple of trajectories about several fixed ball locations. Nevertheless, these measurements may be very quickly and easily performed. Also, since the measurements are in relation to a null signal whose absolute value is of no fundamental importance, the test gage is very rugged and can withstand relatively rough treatment. The test gage itself is very simple and may be quickly and economically fabricated.

Additionally, the test gage of the invention can be used to measure radial center-to-center spacing changes associated with partial circular trajectories. In this mode of operation it is necessary to very accurately know gage ball center-to-center spacing. The reason for this is that, with partial circular trajectories, arc distortion due to mis-centering can occur. The theory of these measurements is given in "American National Standard Measurement of Out-of-Roundness, ANSI B89.3.1-1972", The American Society of Mechanical Engineers.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the function performed by gage ball 12 and second magnetic socket knuckle assembly 38 could be somewhat accomplished by having the machine move a metal cylinder, supported on frictionless air bearings, about a prescribed path upon a flat surface. This scheme would have the disadvantage of requiring a heavy air compressor and cumbersome ancillary apparatus. Therefore, the preferred embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What I claim is:

1. A test gage for determining the accuracy of an associated machine having a servo drive, which comprises:
   a first gage ball;
   a second gage ball;
   telescoping holding means for maintaining said first gage ball and said second gage ball in a relationship allowing relative radial motional freedom while not allowing relative lateral motional freedom;
   a first means for securing said first gage ball so that the center of said first gage ball is maintained at a fixed location with respect to an associated machine;
   a second means for securing said second gage ball so that the center of said second gage ball is directed by an associated machine to execute a prescribed trajectory, all points of which are equidistant from the center of said first gage ball; and
   means for determining changes in the radial distance between the center of said first gage ball and the center of said second gage ball, whereby error in the execution of the directed trajectory is detected and the accuracy of an associated machine is determined.

2. A test gage, as recited in claim 1, in which said first securing means comprises a first magnetic socket knuckle assembly, and said second securing means comprises a second magnetic socket knuckle assembly.

3. A test gage, as recited in claim 2, in which said telescoping holding means comprises a rigid member and a parallel reed flexure unit.

4. A test gage, as recited in claim 3, in which said determining means comprises a linear variable differential transformer actuated by said parallel reed flexure unit.

5. A test gage, as recited in claims 1, 2, 3 or 4, in which said prescribed trajectory is circular.

6. A method for determining the accuracy of a machine having a servo drive, the method comprising the steps of:
   maintaining two gage balls in a relationship allowing relative radial motional freedom while not allowing relative lateral motional freedom;
   securing the first gage ball so that the center of the first gage ball is maintained at a fixed location with respect to the machine;
   securing the second gage ball so that the center of the second gage ball is directed by the machine to execute a prescribed trajectory, all points of which are equidistant from the center of the first gage ball; and
   determining changes in the radial distance between the center of the first gage ball and the center of the second gage ball, so that error in the execution of the directed trajectory is detected and the accuracy of the machine is determined.

7. A method according to claim 6, wherein the step of securing the first gage ball includes positioning the first gage ball in a first magnetic socket knuckle assembly, and wherein the step of securing the second gage ball includes positioning the second gage ball in a second magnetic socket knuckle assembly.

8. A method according to claim 7, wherein the maintaining step includes holding the two gage balls with telescoping apparatus comprising a rigid member and a parallel reed flexure unit.

9. A method according to claim 8, wherein the determining step includes actuating a linear variable differential transformer by the parallel reed flexure unit.

10. A method according to claims 6, 7, 8 or 9, wherein the prescribed trajectory is circular.

* * * * *